May 27, 1958  C. M. MALY  2,836,789
UNIVERSAL VOLTAGE REGULATOR
Filed Dec. 6, 1954  3 Sheets-Sheet 1
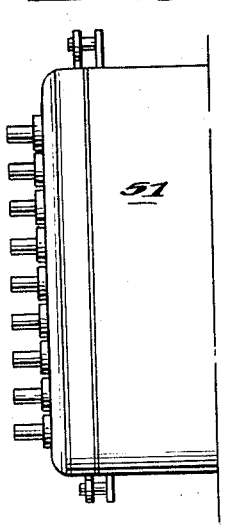
Fig. 2.
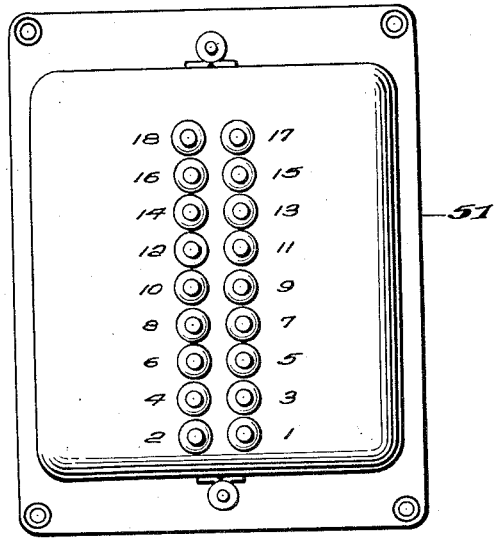
Fig. 1.
Fig. 4.
INVENTOR
Claude M. Maly
BY Pierce, Scheffler & Parker
ATTORNEYS

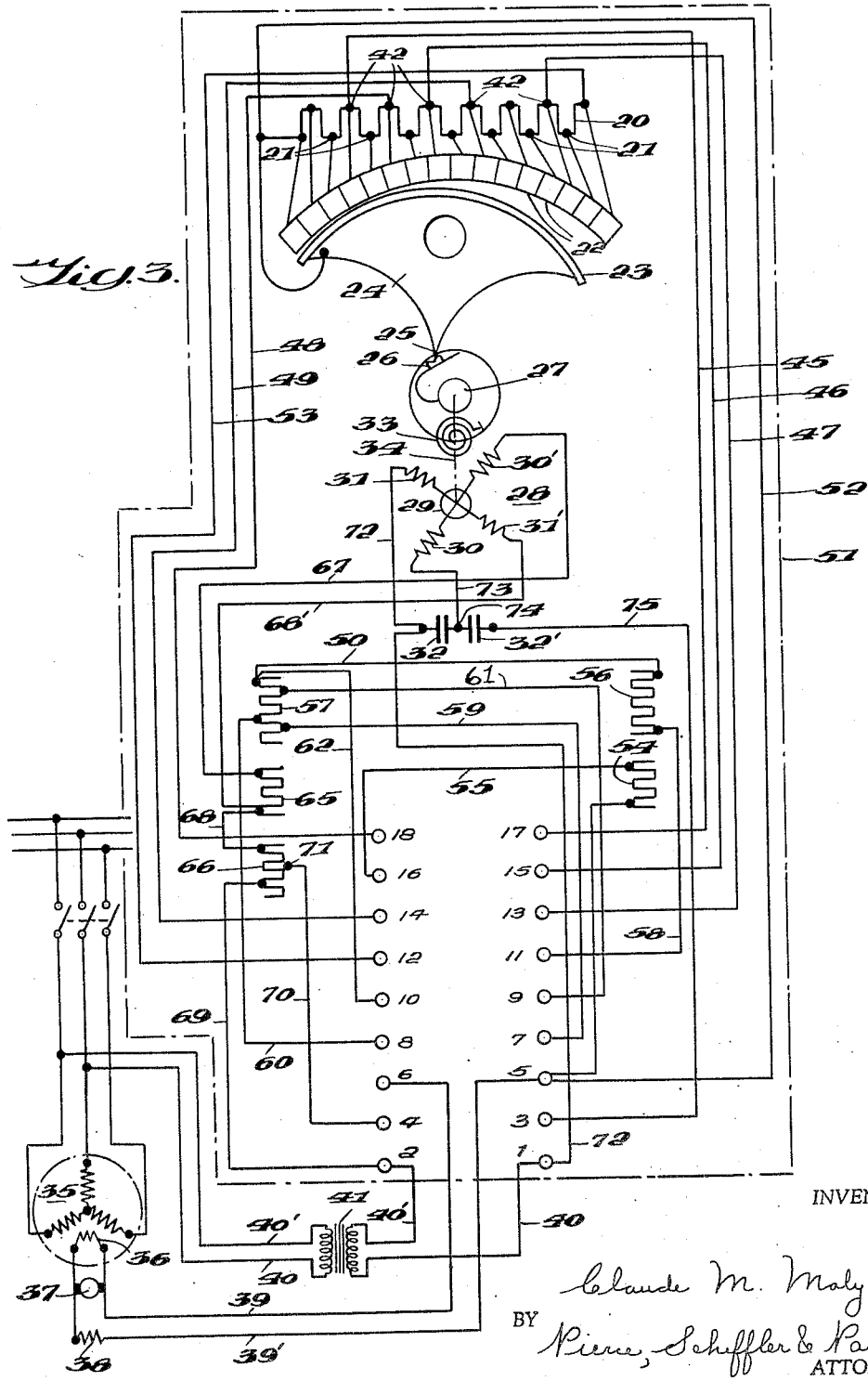

May 27, 1958     C. M. MALY     2,836,789

UNIVERSAL VOLTAGE REGULATOR

Filed Dec. 6, 1954     3 Sheets-Sheet 3

INVENTOR
Claude M. Maly
BY Pierce, Scheffler & Parker
ATTORNEYS

United States Patent Office 2,836,789
Patented May 27, 1958

2,836,789

UNIVERSAL VOLTAGE REGULATOR

Claude M. Maly, New York, N. Y., assignor to Brown, Boveri Corporation, New York, N. Y., a corporation of New York Application December 6, 1954, Serial No. 473,211

5 Claims. (Cl. 323—66)

The present invention relates to voltage regulators for alternating current generators and more particularly regulators for regulating the field excitation of the exciter unit, itself a small, direct current generator, which supplies the field current to the alternating current generator.

The voltage regulator is fundamentally a power driven variable resistance or rheostat, which is connected in series with the shunt field winding of the exciter unit, and the effect of varying its in-circuit resistance is to raise or lower, as the condition may require, the voltage output of the exciter unit which, in turn, effects a corresponding change in field excitation of the alternating current generator which, in turn, effects a corresponding change in its output voltage. If the output voltage of the alternating current generator drops below the desired value, the effective resistance of the regulator introduced into the exciter shunt field circuit decreases; conversely when the alternating current generator voltage rises above its desired value, the effective resistance of the regulator is increased. The overall result is to maintain the output voltage of the alternating current generator at a substantially constant value.

To applicant's knowledge, all regulators in the past have been designed for a specific application depending upon the rating of the exciter unit which, of course, determines the resistance characteristic of the variable resistance component of the regulator and also the size of the limiting resistor which is often for separate mounting. This has its disadvantages for a manufacturer of switchboards who supplies control panels for many different exciter generator sets since it requires him to carry a large number of different regulators in stock so as to be able to give quick delivery. The object of the present invention is to provide what might be termed a universal regulator unit in that the same basic unit is capable of being applied to a relatively wide range of exciter units thus enabling the panel builder to carry a much smaller inventory of regulators with a corresponding reduction in cost. A further object of this invention is to provide a generator voltage regulator containing shunt field current limiting means so arranged that, with the smallest possible number of limiting resistor elements i. e., in the smallest possible regulator casing, the greatest possible number of different resulting resistance values with the highest possible resulting watt ratings can be obtained.

In general, the objective of the invention is attained by making it possible for an operator to modify the regulating resistance by means of a system of jumpering at terminals brought to the exterior of the casing which houses the operating components of the regulator and which are properly coded in accordance with a chart, or instruction sheet, or the like, to permit selection of the proper connections without having to enter the interior of the regulator casing which preferably is sealed by lead tags as a protection against meddling.

More specifically, from an electrical point of view, the objective is attained by providing the variable regulating resistance with a plurality of taps which, in the construction to be described, are five in number. These taps, as well as the ends of the variable resistance, are brought out to seven terminals located exteriorly of the casing. One end of a supplementary resistance to be arranged in parallel with a selected part of the variable regulating resistance is connected to one end of the latter internally of the casing. The other end of the supplementary resistance is brought out to a terminal exteriorly of the casing so that it may be connected by the operator to any one of the five external terminals connected respectively to the five taps on the variable regulating resistance thus connecting the supplementary resistance across the corresponding section of the variable regulating resistance to correspondingly decrease the total ohmic value of the resistance desired to be connected in series with the shunt field circuit of the exciter generator. In this manner the operator can select the connection which will give the basic resistance characteristic required for a particular size of exciter generator.

In addition to the foregoing feature, the improved regulator is also provided with two protective or limiting resistors, one of which has two taps, that are brought out to five other terminals exteriorly of the casing. These protective resistors are adapted to be connected in series with the parallel connected regulating and supplementary resistances, or to be by-passed altogether and their in-circuit resistance can also be selected by the operator by appropriate jumpering connections at the corresponding external terminals on the casing.

Four other terminals are also brought out to the exterior of the casing. These terminals lead through still other resistors and capacitors to the four coil components of the motive system, a torque motor, in the regulator which is coupled to the element that effects the variation in the regulating resistance necessary to correct for departures of the voltage of the alternating current generator from the desired value. Two of these terminals are conveniently arranged for jumpering for application of the regulator to a 50 cycle generator and the other two are jumpered when the generator to be regulated operates at 60 cycles. Here again, the operator is enabled to select the proper connections without having to go inside of the casing.

The foregoing as well as other objects and advantages inherent in the invention will become apparent from the following detailed description of a preferred embodiment thereof and the accompanying drawings wherein:

Fig. 1 is a rear elevation of the casing which houses the various operating components of the regulator, this view showing the external terminals to be variously connected by the operator.

Fig. 2 is a fragmentary side elevation of the casing;

Fig. 3 is a circuit diagram of the regulator and the manner in which the regulator functions to control the generator voltage;

Fig. 4 is a chart showing the various possible connections for the supplementary paralleling resistance;

Figure 5:
Fig. 5 is a chart showing the various possible connections for the series limiting resistance.

With reference now to the drawings and particularly to Fig. 3, the conventional components of the particular regulator illustrated are seen to be comprised of a regulating resistor 20 constituted by a large number, for example fifty, individual resistors connected in series. Not all of these can be shown on the drawing. Taps 21 between adjacent resistors are brought to corresponding heavily silver plated contact segments 22 arranged in a curved contact track. The various contact segments are adapted to be contacted in succession by an arcuate bar 23 of finely machined carbon which is secured by suitable means to the rim of a contact sector 24 made preferably of anodized aluminum which is fully stress relieved. The vertex of sector 24 is a needle point 25 which rests in a jewelled cup 26 attached to a shaft 27, which in turn is rotated by a torque motor 28 through suitable gearing, not shown. Torque motor 28 is of the Ferraris type, consisting of an aluminum drum type rotor 29 mounted for rotation on jeweled bearings, not shown, the rotor being under the influence of the magnetic field produced by a four pole stator having two pairs of field coils 30—30' and 31—31'. One pair 30—30' of these coils is connected to the input alternating current line from the generator to be regulated while the other pair of coils 31—31' is connected to such input depending upon the frequency through either one or both capacitors 32—32' as in a capacitor-start, single phase inducton motor. The torque produced by the rotor is balanced by a spiral spring 33 secured to the rotor shaft 34. If the generator voltage departs from the value to be maintained, the opposing torques due to the stator field and spring 33 become unequal effecting an angular displacement of rotor 29 and hence also an angular displacement of the contact sector 24. This causes the carbon bar 23 to rock along segments 22 of the contact track cutting resistance into or out of the exciter shunt field circuit, thus changing the exciter output voltage and hence also the field current of the alternating current generator in the proper sense to restore the generator voltage to its desired value.

In the interest of completeness, the alternating current generator to be regulated is shown schematically at 35 and its field winding is indicated at 36. The latter is supplied with direct current from an exciter generator 37, and the shunt field 38 of the exciter has connected in series with it by leads 39—39' the variable and selectively also the fixed resistance provided by the regulator. The torque motor 28 of the regulator is supplied with an alternating voltage proportional to the output voltage of generator 35 through leads 40—40' and a potential transformer 41.

The organization so far defined is conventional. The present invention, as explained in the introductory part, is directed to an improvement on the regulator itself which enables the same instrument to be utilized universally to handle the voltage regulation of any standard alternating current generator in a rather wide range of ratings. The particular regulator described herein, known as Type JSG1/1 is sold by Brown Boveri Corporation.

In accordance with the invention, the variable regulating resistor 20 is provided with a plurality of, in the present case five, taps 42 which are brought out through leads 45—49 to five terminals located on the exterior of the casing 51 which houses the operating components of the regulator. In the present embodiment these terminals numbered 13, 14, 15, 17 and 18 are located on the rear wall of the casing but their particular location is not significant so long as they are readily accessible to the operator without having to enter the casing where the operating components of the regulator are located. The opposite ends of resistor 20 are similarly brought out through leads 52, 53 to two other exterior terminals numbered 5 and 12.

One end of a supplementary resistor 54, adapted to be connected in parallel with a selected part of the regulating resistor 20, is connected to one end of resistor 20 internally of the casing 51 at that end of terminal 5 located within the casing. The other end of resistor 54 is brought out via lead 55 to an exterior terminal numbered 16 so that it may be connected by the operator via jumpers with any one of the six terminals 12, 13, 14, 15, 17 and 18 and hence with any one of the corresponding taps 42 on resistor 20, thus connecting the supplementary resistor 54 across the corresponding section of resistor 20 or across all of it when connection with terminal 12 is made and thereby correspondingly decreasing the maximum of the in-circuit resistance supplied between the ends of resistor 20.

The chart in Fig. 4 shows seven different connections possible, these being lettered A through F, and Z, and giving the ohmic values of the resistance effected thereby. For example, in box A, it is seen that a resistance value of 100 ohms is obtained by connecting a jumper between terminal 16 and terminal 13. In box B, a jumper from terminal 16 to terminal 14 will establish a resistance value of 120 ohms. It is also possible to connect terminal 16 to terminal 12, as indicated in box Z, in which case the entire length of the resistor 20 is paralleled by the supplementary resistor 54 to establish a resistance value of 70 ohms. It is also possible not to connect the supplementary resistor 54 into any part of the resistor 20 as indicated by box F in which case the maximum resistance value of 200 ohms is obtained.

Thus it is seen that the resistance characteristic of the regulator may easily be set by an operator in accordance with the chart, Fig. 4, to provide the correct characteristic for a particular generator without having to go inside of the casing. Moreover, as previously explained, a regulator according to the invention being within its specified limits universal in application over a rather wide range of generator sizes reduces considerably the regulator inventory which it is necessary to maintain, thereby reducing the costs. Another advantage is that there is less chance of there not being a suitable regulator available when the need for replacement arises for a particular size of generator.

In addition to the supplementary resistor 54 provided for connection in parallel with the regulating resistor 20, the present invention provides for insertion of adjustable amounts of limiting resistance in series with the regulating resistance provided by resistors 20 and 54, if such a limiting resistance should be required. In the present embodiment, two such limiting resistors 56, 57 are incorporated in the regulator. One end of resistor 56 is connected via lead 58 to another external terminal on the casing numbered 11 and the other end of resistor 56 is connected to one end of resistor 57 by lead 50. The other end of resistor 57 is connected via lead 59 to exterior terminal number 7. Two taps at different points along the length of 57 are connected via leads 60, 61 respectively to exterior terminals numbered 8 and 9. In addition, a connection is made via lead 62 from that end of resistor 57 which connects with the end of resistor 56 to another exterior terminal numbered 10.

As in the case of the paralleling supplementary resistor 54, the operator can, by a choice of proper jumpering between external terminals in accordance with the chart shown in Fig. 5, establish any desired fixed value of limiting resistance in series with the variable regulating resistor group 20, 54. The various possibilities are indicated by the boxes lettered G, H, I, K, L, M, O, P, R, S, T, U, V, W and X.

One lead 39 of the field circuit of the exciter generator is connected to exterior terminal 6 and the other lead 39' is connected to exterior terminal 5. As indicated by box H, a jumper between terminal 6 and terminal 8, and another jumper interconnecting terminals 7, 9 and 12 will produce 5.5 ohms of series limiting resistance. Other values of limiting resistance from 4 to 35 ohms can be obtained by various other combinations of jumpering as indicated in the other boxes. The limiting resistors can also be by-passed completely, if desired, by the jumpering connections shown in box X where terminals 6, 8, 10 and 12 are interconnected.

Preferably the regulator is also constructed so to permit use on either 50 or 60 cycle generator systems. To this end, it is seen from Fig. 3 that the regulator includes two more resistors 65, 66 for connection in series with the field coils 30—30' and 31—31' of the torque motor 28. One end of resistor 65 is connected via lead 67 to one end terminal of coil pair 30—30'. The other end of resistor 65 is connected via lead 68 to one end of resistor 66 and also via lead 68' to one end terminal of coil pair 31—31'. The other end of resistor 66 is connected via lead 69 to the exteriorly located terminal 2. A connection is also made from exteriorly located terminal 4 via lead 70 to a tap 71 on resistor 66. The other end terminal of coil pair 31—31' is connected via lead 72 to capacitor 32 and also to exteriorly located terminal 1, and the other end terminal of coil pair 30—30' is connected via lead 73 to a tap 74 intermediate the two capacitors 32—32'. Still another lead 75 extends from the capacitor 32' to exteriorly located terminal 3. The leads 40—40' from the potential transformer 41 connect respectively with the exteriorly located terminals 1 and 2.

Figure 6:
Fig. 6 is a chart showing the two alternative connections for the elements arranged in circuit with the coil components of the torque motor to adapt the latter for 50 or 60 cycle operation.

For operation on a 50 cycle system, the chart in Fig. 6 shows that a jumper is to be placed between exterior terminals 1 and 3. With this connection, the energizing circuit for coil pair 31—31' of torque motor 28 can be traced from input terminal 1 through lead 72 to one end of coil pair 31—31' and from the other end of this coil pair via leads 68', 68 through all of resistor 66 and lead 69 to the other input terminal 2. The energizing circuit for the other coil pair 30—30' of motor 28 can be traced from input terminal 1 via lead 72 through capacitor 32, and also via lead 75 through the other capacitor 32', which is thus in parallel with capacitor 32, thence via lead 73 from tap 74 to one end of coil pair 30—30' and from the other end of this coil pair via lead 67 through resistors 65 and 66 in series and lead 69 to the other input terminal 2.

For operation on a 60 cycle system, the chart in Fig. 6 shows that a jumper is to be placed between exterior terminals 2 and 4. With this connection, the energizing circuit for coil pair 31—31' can be traced from input terminal 1 through lead 72 to one end of coil pair 31—31' and from the other end of this coil pair via leads 68', 68 through part of resistor 66 and lead 70 and terminal 4 to the other input terminal 2. The energizing circuit for the other coil pair 30—30' can be traced from input terminal 1 via lead 72 through capacitor 32, thence via tap 74, lead 73 to one end of coil pair 30—30' and from the other end of this coil pair via lead 67 through all of resistor 65 and part of resistor 66 and thence via lead 70 and terminal 4 to the other input terminal 2.

In conclusion it will be seen that the invention provides a universal voltage regulator that can be easily adapted to generators of various ratings by the operator through the simple expedient of terminal selections and jumpering therebetween, the terminals being expressly located on the exterior of the casing in which the several electrical components of the regulator are located to avoid the necessity for entering the casing itself and which is preferably sealed to prevent tampering with the mechanism. Moreover it is to be understood that the particular regulator structure is to be considered typical rather than limitative and hence permits of alternative constructions without departing from the spirit and scope of the invention as defined in the appended claims.

I claim:

1. In a voltage regulator, the combination comprising a casing, said casing containing a variable regulating resistor having a plurality of taps therealong, means responsive to the voltage to be regulated for varying the resistance of said regulating resistor, a supplementary resistor disposed within said casing and constituting a permanent component of said regulator, external terminals on said casing, and electrical connections between said resistors and external terminals and between said taps and external terminals arranged such that said supplementary resistor may be connected in parallel with selected sections of said regulating resistor by jumpering between said external terminals.

2. A voltage regulator as defined in claim 1 and which further includes limiting resistor means within said casing, and electrical connections between said limiting resistor means and other external terminals on said casing so arranged that selected portions of said limiting resistor means may be connected in series with said regulating resistor by means including jumpering between said other external terminals.

3. In a voltage regulator, the combination comprising a casing, said casing containing a variable regulating resistor having a plurality of taps therealong, means responsive to the voltage to be regulated for varying the resistance of said regulating resistor, a supplementary resistor disposed within said casing and constituting a permanent component of said regulator, conductor means connecting one end of said regulating resistor to one end of said supplementary resistor, a plurality of external terminals on said casing, conductor means connecting the other end of said supplementary resistor to one of said external terminals, and conductor means connecting each of said taps on said regulating resistor to a corresponding one of said external terminals thereby to permit said supplementary resistor to be connected in parallel with any selected section of said regulating resistor in accordance with a selected jumpering between said external terminals.

4. In a voltage regulator, the combination comprising a casing, said casing containing a variable regulating resistor having a plurality of taps therealong, means for varying the resistance of said regulating resistor, a supplementary resistor disposed within said casing and constituting a permanent component of said regulator, a first set of external terminals on said casing, electrical connections between said resistors and external terminals and between said taps and external terminals arranged such that said supplementary resistor may be connected in parallel with selected sections of said regulating resistor by jumpering between said external terminals, limiting resistor means for connection in series with said regulating resistor, a second set of external terminals on said casing, and electrical connections between said limiting resistor means and said external terminals of said second set arranged such that selected portions of said limiting resistor means may be connected in series with said regulating resistor by selected jumpering between said external terminals of said second set.

5. In a voltage regulator, the combination comprising a casing, said casing containing a variable regulating resistor having a plurality of taps therealong, means for varying the resistance of said regulating resistor, a supplementary resistor disposed within said casing and constituting a permanent component of said regulator, conductor means connecting one end of said regulating resistor to one end of said supplementary resistor, a plurality of external terminals on said casing, conductor means connecting the other end of said supplementary resistor to one of said external terminals, conductor means connecting each of said taps on said regulating resistor to a corresponding one of said external terminals, thereby to permit said supplementary resistor to be connected in parallel with any selected section of said regulating resistor in accordance with a selected jumpering between said external terminals, limiting resistor means connected in series with said regulating resistor, conductor means connecting the ends of said series connected limiting resistor means and regulating resistor to corresponding external terminals on said casing, and conductor means connecting said limiting resistor means to corresponding external terminals on said casing thereby to permit the amount of resistance supplied by said limiting resistor means in series with said regulating resistor to be selected by jumpering between the last said external terminals.

(References on following page)

References Cited in the file of this patent

UNITED STATES PATENTS

| | | |
|---|---|---|
| 2,373,156 | Wilhelm | Apr. 10, 1945 |
| 2,463,384 | Holmqvist | Mar. 1, 1949 |
| 2,482,441 | Sjoberg | Sept. 20, 1949 |
| 2,680,225 | Stevens | June 1, 1954 |
| 2,707,222 | Brown et al. | Apr. 26, 1955 |

FOREIGN PATENTS

| | | |
|---|---|---|
| 158,647 | Switzerland | Feb. 6, 1933 |